US009154042B2

(12) United States Patent
Kim et al.

(10) Patent No.: US 9,154,042 B2
(45) Date of Patent: Oct. 6, 2015

(54) POWER SUPPLY APPARATUS

(71) Applicant: SAMSUNG ELECTRO-MECHANICS CO., LTD., Suwon, Gyunggi-do (KR)

(72) Inventors: Jae Kuk Kim, Gyunggi-do (KR); Chong Eun Kim, Gyunggi-do (KR); Sung Ho Kim, Gyunggi-do (KR); Dong Kyun Ryu, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 184 days.

(21) Appl. No.: 13/839,355

(22) Filed: Mar. 15, 2013

(65) Prior Publication Data
US 2014/0185329 A1 Jul. 3, 2014

(30) Foreign Application Priority Data

Dec. 27, 2012 (KR) .......................... 10-2012-0155296

(51) Int. Cl.
*H02M 3/335* (2006.01)
*H02M 3/158* (2006.01)

(52) U.S. Cl.
CPC .. *H02M 3/33538* (2013.01); *H02M 2003/1586* (2013.01)

(58) Field of Classification Search
CPC ........................... H02M 3/337; H02M 3/33569
USPC ........ 363/16–20, 21.03, 21.04, 56.06, 40, 47, 363/98, 127, 132; 323/271–274, 282–289
See application file for complete search history.

(56) References Cited

U.S. PATENT DOCUMENTS

| 5,801,932 | A   | * | 9/1998 | Hwang et al. ............... 363/21.04 |
| 5,883,795 | A   | * | 3/1999 | Farrington .................. 363/21.04 |
| 6,239,989 | B1  | * | 5/2001 | Ming-Ching ................... 363/20 |
| 6,512,252 | B1  | * | 1/2003 | Takagi et al. ................. 257/192 |
| 6,611,444 | B2  | * | 8/2003 | Ayyanar et al. ............... 363/132 |
| 6,744,642 | B2  | * | 6/2004 | Hung ........................ 363/21.06 |
| 7,016,203 | B2  |   | 3/2006 | Xu et al. |
| 8,451,630 | B2  | * | 5/2013 | Nania et al. ................ 363/21.04 |
| 2006/0139967 | A1 |  | 6/2006 | Quitayen |

OTHER PUBLICATIONS

Yu-Kang Lo et al. "Analysis and designe of an interleaved Active-Clamping Foward converter" IEEE Transactions on In dustrial Electronics, Aug. 2007, vol. 54. No. 4.*
Yu-Kang Lo et al., "Analysis and Design of an Interleaved Active-Clamping Forward Converter", IEEE Transactions on Industrial Electronics, Aug. 2007, vol. 54, No. 4.
Korean Office Action with English translation issued in Korean Patent Application No. 10-2012-0155296 dated Dec. 16, 2013.

* cited by examiner

*Primary Examiner* — Rajnikant Patel
(74) *Attorney, Agent, or Firm* — McDermott Will & Emery LLP

(57) ABSTRACT

There is provided a power supply apparatus including an interleaved active clamp forward converter unit including a first active clamp forward converter and a second active clamp forward converter, and an output unit magnetically coupled to the forward converter unit and having an output path according to a duty ratio of the forward converter unit, wherein the output unit includes a third powering leg electrified when the first active clamp forward converter and the second active clamp forward converter are powered, and an output leg supplying power to a load.

8 Claims, 11 Drawing Sheets

POWER SUPPLY APPARATUS

CROSS-REFERENCE TO RELATED APPLICATIONS

This application claims the priority of Korean Patent Application No. 10-2012-0155296 filed on Dec. 27, 2012, in the Korean Intellectual Property Office, the disclosure of which is incorporated herein by reference.

BACKGROUND OF THE INVENTION

1. Field of the Invention

The present invention relates to a power supply apparatus in which a duty ratio of a switching element used for powering a device connected to the power supply apparatus (i.e., providing power to a device connected to the power supply apparatus) is increased.

2. Description of the Related Art

An interleaved active clamp forward converter is commonly used due to advantages thereof allowing for zero voltage switching of all the switching elements and reducing conduction loss.

However, in the case of an existing circuit, a maximum duty ratio of a switching element used for powering may be limited to 0.5 or less or a driving circuit for switching driving of a secondary side may be overly complex.

Thus, a new interleaved active clamp forward converter overcoming the foregoing shortcomings is required.

Patent document 1 below relates to a full-bridge forward converter, without disclosing a configuration for increasing a duty ratio of a powering switching element.

RELATED ART DOCUMENT (Patent 1) U.S. Pat. No. 7,016,203

SUMMARY OF THE INVENTION

An aspect of the present invention provides a power supply apparatus in which a duty ratio of a switching element used for powering a device (or providing power to a device) is increased.

Another aspect of the present invention provides a power supply apparatus in which a switching element of a secondary side circuit is driven without a floating gate driver.

According to an aspect of the present invention, there is provided a power supply apparatus including: an interleaved active clamp forward converter unit including a first active clamp forward converter and a second active clamp forward converter; and an output unit magnetically coupled to the forward converter unit and having an output path according to a duty ratio of the forward converter unit, wherein the output unit includes a third powering leg electrified (i.e., a current flows in the third powering leg) when the first active clamp forward converter and the second active clamp forward converter are powered; and an output leg supplying power to a load.

The first active clamp forward converter may include: a primary side winding of a first transformer connected to a positive (+) terminal of a power input unit; a second switching element connected between a negative (−) terminal of the power input unit and the primary side winding of the first transformer; a first clamping capacitor connected to a contact between the primary side winding of the first transformer and the positive (+) terminal of the power input unit; and a first switching element connected between a contact between the second switching element and the primary side winding of the first transformer and the first clamping capacitor.

The second active clamp forward converter may include: a primary side winding of a second transformer connected to the positive (+) terminal of the power input unit; a fourth switching element connected between the negative (−) terminal of the power input unit and the primary side winding of the second transformer; a second clamping capacitor connected to a contact between the primary side winding of the second transformer and the positive (+) terminal of the power input unit; and a third switching element connected between a contact between the fourth switching element and the primary side winding of the second transformer and the second clamping capacitor.

The output unit may include a first powering leg electrified when the first active clamp forward converter is powered.

The first powering leg may include a first secondary side winding of a first transformer and a fifth switching diode connected in series.

The output unit may include a second powering leg electrified when the second active clamp forward converter is powered.

The second powering leg may include a first secondary side winding of a second transformer and a sixth switching diode connected in series.

The third powering leg may include a second secondary winding of the first transformer, a second secondary side winding of the second transformer, and a seventh switching diode connected in series.

The output unit may include a freewheeling leg providing a freewheeling path for the first active clamp forward converter and the second active clamp forward converter.

According to another aspect of the present invention, there is provided a power supply apparatus including: an interleaved active clamp forward converter unit including a first active clamp forward converter and a second active clamp forward converter; and an output unit having an output path according to driving of the forward converter unit, wherein the output unit includes: a first powering leg electrified when the first active clamp forward converter is powered; a second powering leg electrified when the second active clamp forward converter is powered; and a third powering leg electrified when the first active clamp forward converter and the second active clamp forward converter are electrified.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
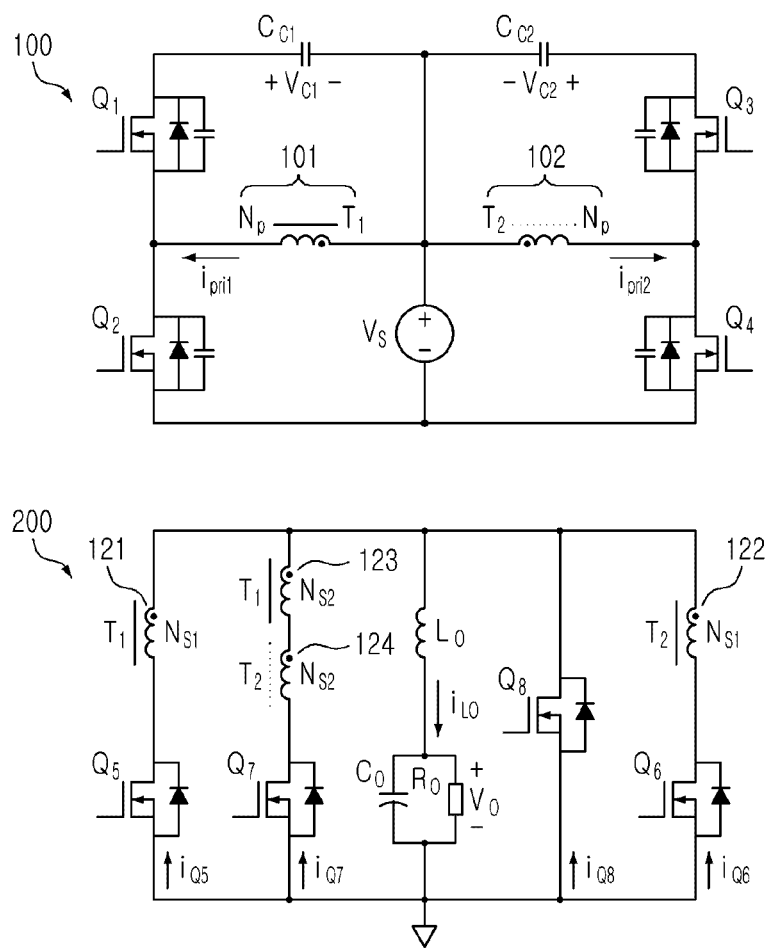
FIG. 1 is a circuit diagram of a power supply apparatus according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is a circuit diagram of a power supply apparatus according to an embodiment of the present invention.

A power supply apparatus according to an embodiment of the present invention will be described in detail with reference to FIG. 1.

Referring to FIG. 1, the power supply apparatus according to an embodiment of the present invention may include a primary side converter circuit 100 and a secondary side converter circuit 200.

The primary side converter circuit 100 is a circuit configured by connecting a first active clamp forward converter and a second active clamp forward converter in an interleaved manner.

The interleaved active clamp forward converter (i.e., the primary side converter circuit 100) has advantages in that all switches can be zero-voltage switched and conduction loss can be reduced.

The first active clamp forward converter 100 may include a primary side winding 101 of a first transformer $T_1$, a second switching element $Q_2$, a first clamping capacitor $C_{C1}$, and a first switching element $Q_1$.

In an embodiment of the present invention, one end of the primary side winding 101 of the first transformer $T_1$ is connected to a positive (+) terminal of an power input unit Vs, and the other end of the primary side winding 101 of the first transformer $T_1$ is connected to a negative (−) terminal of the power input unit Vs by way of the second switching element $Q_2$.

Namely, the second switching element $Q_2$ may be connected between the negative (−) terminal of the power input unit Vs and the primary side winding 101 of the first transformer $T_1$.

The second switching element $Q_2$ may power the first transformer $T_1$.

Also, in an embodiment of the present invention, one end of the first clamping capacitor $C_{C1}$ is connected to a contact between the primary side winding 101 of the first transformer $T_1$ and the positive (+) terminal of the power input unit Vs. The other end of the first clamping capacitor $C_{C1}$ is connected to a contact between the primary side winding 101 of the first transformer $T_1$ and the second switching element $Q_2$ by way of the first switching element $Q_1$.

Namely, the first switching element $Q_1$ may be connected to the contact between the second switching element $Q_2$ and the primary side winding 101 of the first transformer $T_1$ and one end of the first clamping capacitor $C_{C1}$.

The first switching element Q1 and the first clamping capacitor $C_{C1}$ may be used for active clamping of the first transformer $T_1$.

The second active clamp forward converter may include a primary side winding 102 of a second transformer $T_2$, a fourth switching element $Q_4$, a second clamping capacitor $C_{C2}$, and a third switching element $Q_3$.

In an embodiment of the present invention, one end of the primary side winding 102 of the second transformer $T_2$ is connected to the positive (+) terminal of the power input unit Vs, and the other end of the primary side winding 102 of the second transformer $T_2$ is connected to the negative (−) terminal of the power input unit Vs by way of the fourth switching element $Q_4$.

Namely, the fourth switching element $Q_4$ may be connected between the negative (−) terminal of the power input unit Vs and the primary side winding 102 of the second transformer $T_2$.

The fourth switching element $Q_4$ may power the second transformer $T_2$.

Also, in an embodiment of the present invention, one end of the second clamping capacitor $C_{C2}$ is connected to a contact between the primary side winding 102 of the second transformer $T_2$ and the positive (+) terminal of the power input unit Vs. Also, the other end of the second clamping capacitor $C_{C2}$ is connected to a contact between the primary side winding 102 of the second transformer $T_2$ and the second switching element $Q_4$.

Namely, the third switching element $Q_3$ may be connected between the contact between the fourth switching element $Q_4$ and the primary side winding 102 of the second transformer $T_2$ and one end of the second clamping capacitor $C_{C2}$.

The third switching element $Q_3$ and the second clamping capacitor $C_{C2}$ may be used for active clamping of the second transformer $T_2$.

The secondary side converter circuit 200 may be magnetically coupled to the primary side converter circuit. Also, the secondary side converter circuit 200 may provide an output path according to driving of the primary side converter circuit 100. In particular, the secondary side converter circuit 200 may provide an output path according to a duty ratio of the primary side converter circuit 100. Here, the duty ratio of the primary side converter circuit 100 refers to a duty ratio of the second switching element $Q_2$ and the fourth switching element $Q_4$ provided in the primary side converter circuit 100 and involved in powering of the first transformer $T_1$ and the second transformer $T_2$.

Meanwhile, for the purposes of description, the primary side converter circuit 100 may be generally referred to as an interleaved active clamp forward converter unit or a forward converter unit. Also, the secondary side converter circuit 200 may be generally referred to as an output unit.

The output unit 200 may include a first powering leg, a second powering leg, a third powering leg, a freewheeling leg, and an output leg.

Also, the output unit 200 may have a secondary side winding of a first transformer $T_1$ magnetically coupled to the primary side converter circuit 100. Here, the secondary side winding of the first transformer $T_1$ may include a first secondary side winding 121 and a second secondary side winding 123.

Also, the output unit 200 may have a secondary side winding of a second transformer $T_2$ magnetically coupled to the primary side converter circuit 100. Here, the secondary side winding of the second transformer $T_2$ may include a first secondary side winding 122 and a second secondary side winding 124.

The first powering leg may include the first secondary side winding 121 of the first transformer $T_1$ and a fifth switching diode $Q_5$ connected in series.

The first powering leg may be electrified when the first active clamp forward converter is powered.

The second powering leg may include the first secondary side winding 122 of the second transformer $T_2$ and a sixth switching diode $Q_6$ connected in series.

The second powering leg may be electrified when the second active clamp forward converter is powered.

The third powering leg may include the second secondary winding 123 of the first transformer $T_1$, the second secondary winding 124 of the second transformer $T_2$, and a seventh switching diode $Q_7$ connected in series.

The third powering leg may be electrified when the first active clamp forward converter and the second active clamp forward converter are powered.

The freewheeling leg may include an eighth switching element $Q_8$.

The freewheeling leg may provide a freewheeling path for the first active clamp forward converter and the second active clamp forward converter. For example, the freewheeling leg may provide a freewheeling path when the first switching element $Q_1$ and the third switching element $Q_3$ are simultaneously turned on.

The output leg may include an inductor element Lo and a capacitor element Co connected in series. Also, the capacitor element Co may be connected to an output load Ro in parallel.

Thus, the output leg may supply power to the load.

As illustrated in FIG. 1, the first powering leg, the second powering leg, the third powering leg, the freewheeling leg, and the output leg may be connected in parallel.

Also, one ends of the fifth switching element Q5, the sixth switching element Q6, the seventh switching element Q7, and the eighth switching element Q8 may be connected to a ground. In this case, a driver may be formed without floating.

Meanwhile, a winding ratio of the first transformer T1 and the second transformer T2 may be represented by $n=N_{S1}/N_P=N_{S2}/N_P$. Meanwhile, the first switching element $Q_1$ to fourth switching element $Q_4$ may include diodes and parasitic components, respectively.

Hereinafter, an operational principle of the power supply apparatus according to an embodiment of the present invention will be described with reference to FIGS. 2 through 5.

Figure 2:
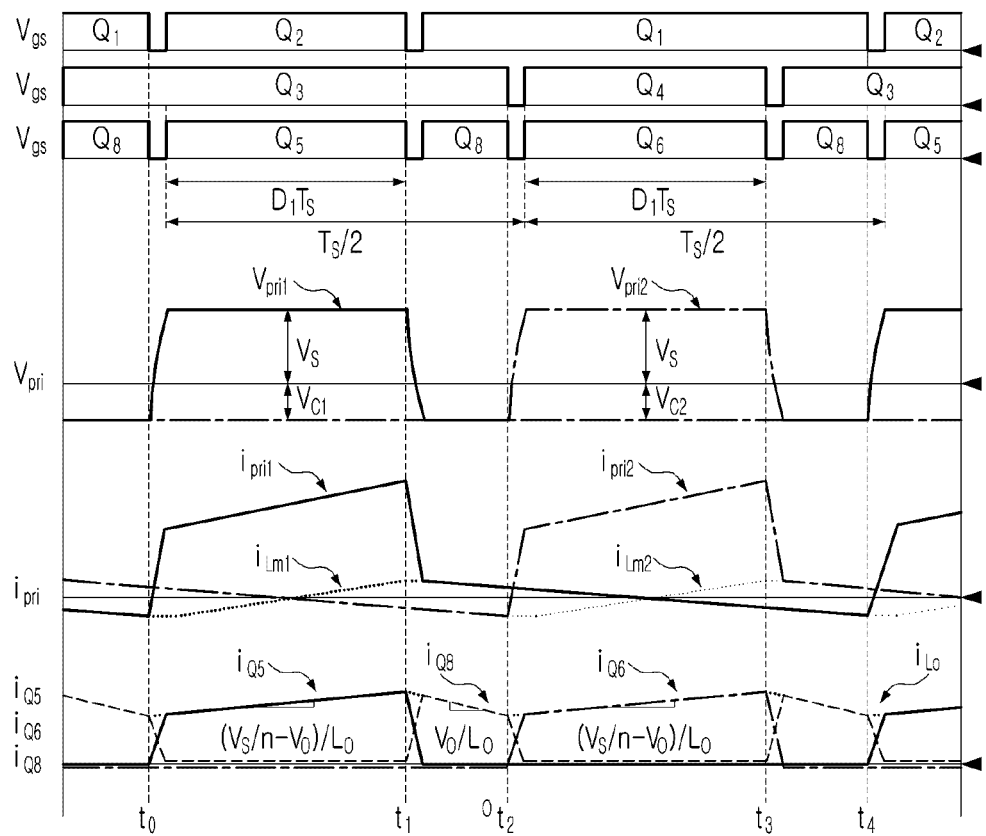
FIG. 2 is a view illustrating operational waveforms of major parts of the circuit in a case in which a duty ratio of a forward converter unit is lower than 0.5.

FIG. 2 is a view illustrating operational waveforms of major parts of the circuit in a case in which a duty ratio of a forward converter unit is lower than 0.5.

FIGS. 3A through 3D are views illustrating operational states of the circuit in the case in which the duty ratio of the forward converter unit is lower than 0.5.

Meanwhile, pale portions in FIGS. 3A through 3D refer to portions in which the circuit does not operate.

Referring to FIG. 2 and FIGS. 3A through 3D, in a case in which the duty ratio of the forward converter unit is set to lower than 0.5, a circuit operation may be divided into a first section t0~t1, a second section t1~t2, a third section t2~t3, and a fourth section t3~t4.

1. First Section (t0~t1)—$Q_3$:ON, $Q_4/Q_6/Q_7$:OFF, $Q_1/Q_8$: TURN OFF $Q_2/Q_5$:TURN ON (Please See FIG. 3A)

Figure 3A:
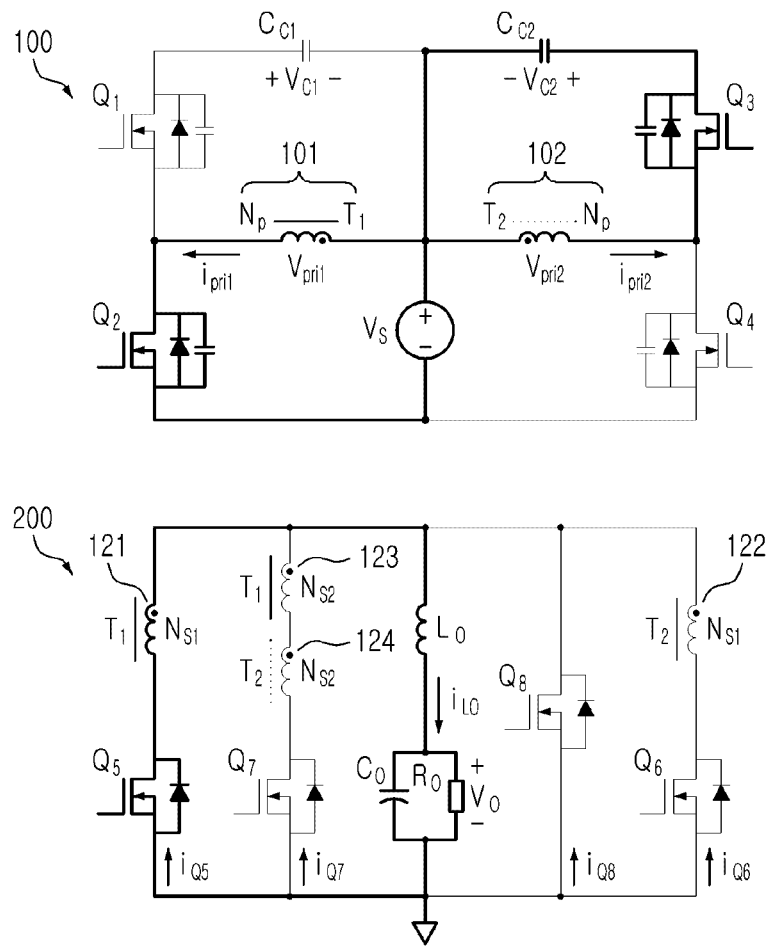
FIGS. 3A through 3D are views illustrating operational states of the circuit in the case in which the duty ratio of the forward converter unit is lower than 0.5.

FIG. 3A illustrates an operational circuit state in the first section.

As the first switching element $Q_1$ is turned off and the second switching element $Q_2$ is turned on, a voltage $V_{pri1}$ of the primary side winding 101 of the first transformer T1 of the converter is equal to the sum of a power source voltage Vs and a voltage charged in the first clamping capacitor $C_{C1}$.

Thus, a primary side current $i_{pri1}$ of the first transformer T1 flowing through the primary side winding 101 of the first transformer T1 and the second switching element $Q_2$ is increased within a predetermined slope.

Meanwhile, since the fifth switching element $Q_5$ is turned on, a voltage of the secondary side winding 121 of the first transformer T1 is Vs/n according to the winding ratio (n:1), and thus, a current $i_{L0}$ flowing to the inductor $L_0$ is increased with a slope of $V_S/n-V_0)/L_0$.

Here, since the third switching element $Q_3$ is in an ON state, a predetermined voltage $V_{C2}$ may be charged in the second clamping capacitor $C_{C2}$.

As discussed above, in the output unit 200, the first powering leg and the output leg are electrified, so a predetermined current $i_{Q5}$ may flow therein.

Also, as discussed above, in the first section, main power is provided from the primary side of the first transformer of the converter to the secondary side of the first transformer.

2. Second Section (t1~t2)—$Q_3$:ON, $Q_4/Q_6/Q_7$:OFF, $Q_2/Q_5$:TURN OFF, $Q_1/Q_8$:TURN ON (Please See FIG. 3B)

Figure 3B:
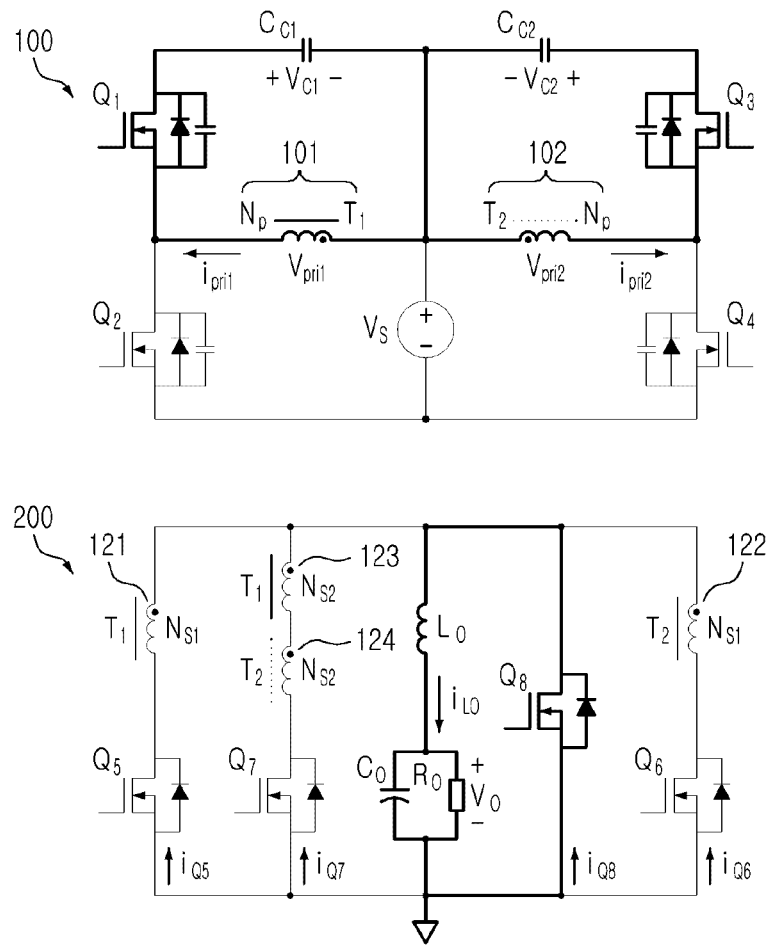

FIG. 3B illustrates an operational circuit state in the second section.

In the second section, the second switching element $Q_2$ is turned off and the first switching element $Q_1$ is turned on. Thus, the fifth switching element $Q_5$ is turned off, and the eighth switching element $Q_8$ is turned on.

In this section, the first transformer $T_1$ is reset by the first clamping capacitor $C_{C1}$. Also, the second transformer $T_2$ is reset by the second clamping capacitor $C_{r2}$.

In this section, the voltage $V_{pri1}$ of the primary side winding 101 of the first transformer T1 is 0V, so the primary side current $i_{pri1}$ of the first transformer $T_1$ flows through a path for the primary side winding 101 of the first transformer $T_1$—the first switching element $Q_1$—the first clamping capacitor $C_{C1}$.

At this time, the current $i_{L0}$ flowing to the inductor $L_0$ of the inductor 200 flows through the eighth switching element $Q_8$. Here, the current $i_{Lo}$ has a slope of $V_0/L_0$.

As discussed above, in this section, the freewheeling leg and the output leg in the output unit 200 are electrified, so a predetermined current $i_{Q8}$ may flow therein.

Here, the converter may operate in a freewheeling mode.

3. Third Section (t2~t3)—$Q_1$:ON, $Q_2/Q_5/Q_7$:OFF, $Q_3/Q_8$: TURN OFF, $Q_4/Q_6$:TURN ON (Please See FIG. 3C)

Figure 3C:
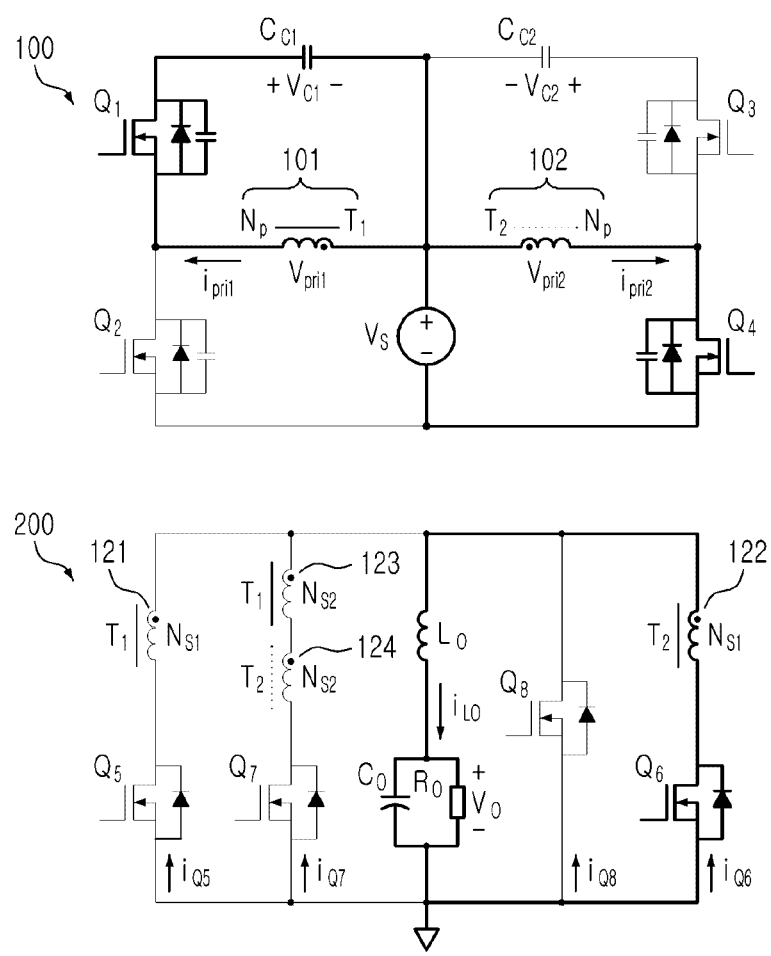

FIG. 3C illustrates an operational circuit state in the third section.

As the third switching element $Q_3$ is turned off and the fourth switching element $Q_4$ is turned on, a voltage $V_{pri2}$ of the primary side winding 102 of the second transformer $T_2$ of the converter is equal to the sum of the power source voltage Vs and a voltage $V_{C2}$ charged in the second clamping capacitor $C_{C2}$.

Thus, a primary side current $i_{pri2}$ of the second transformer $T_2$, flowing along a path for the primary side winding 102 of the second transformer $T_2$—the fourth switching element $Q_4$, is increased with a predetermined slope.

Meanwhile, since the sixth switching element $Q_6$ is turned on, the secondary side winding 122 of the second transformer $T_2$ has a voltage Vs/n according to the winding ratio (n:1), and thus, the current flowing to the inductor $L_0$, is increased with a slope of $(V_S/n-V_0)/L_0$.

In this case, since the first switching element Q1 is in an ON state, a predetermined voltage $V_{C1}$ may be charged in the first clamping capacitor $C_{C1}$.

As discussed above, in this section, in the output unit 200, the second powering leg and the output leg are electrified, so a predetermined current $i_{Q6}$ may flow therein.

As described above, in the third section, main power is powered from the primary side of the second transformer of the converter to the secondary side of the second transformer.

4. Fourth Section (t3~t4)—$Q_1$:ON, $Q_2/Q_5/Q_7$:OFF, $Q_4/Q_6$: TURN OFF, $Q_3/Q_8$:TURN ON (Please See FIG. 3D)

Figure 3D:
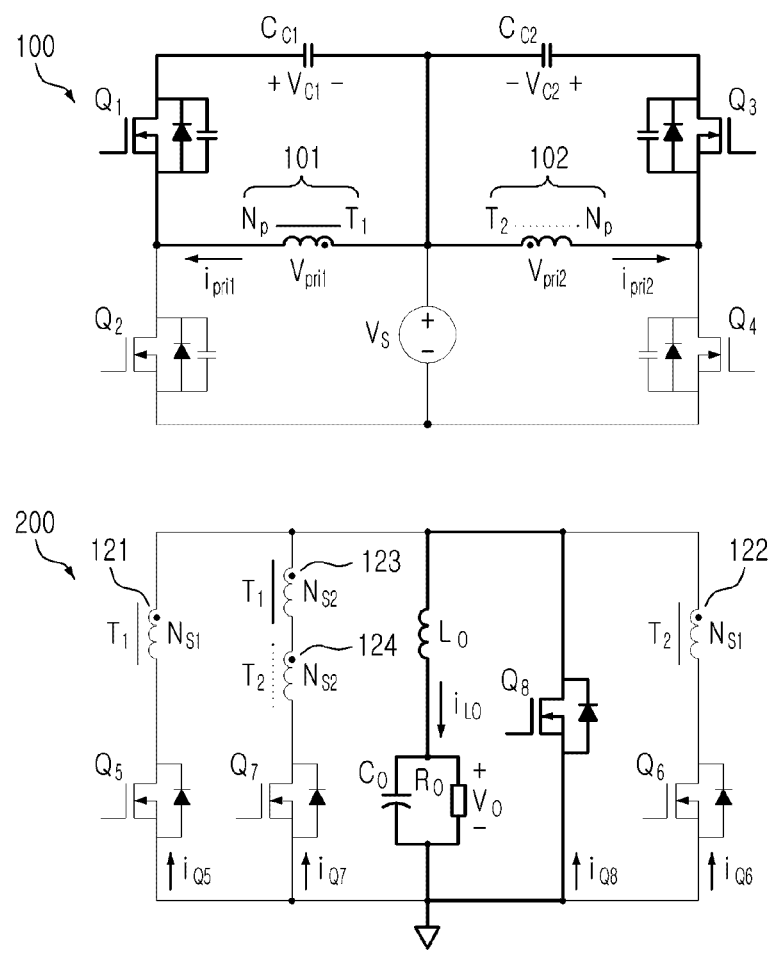

FIG. 3D illustrates an operational circuit state in the fourth section.

In the fourth section, the fourth switching element $Q_4$ is turned off and the third switching element $Q_3$ is turned on. Thus, the fifth switching element $Q_5$ is turned off and the eighth switching element $Q_8$ is turned on.

In this section, the first transformer $T_1$ is reset by the first clamping capacitor $C_{C1}$. Also, the second transformer $T_2$ is reset by the second clamping capacitor $C_{C2}$.

In this section, a voltage $V_{pri2}$ of the primary side winding 102 of the second transformer is 0V, and thus, a primary side current $i_{pri2}$ of the second transformer $T_2$ flows through a path for the primary side winding 102 of the second transformer—the third switching element $Q_3$—the second clamping capacitor $C_{C2}$.

At this time, the current $i_{LO}$ flowing to the inductor $L_0$ of the inductor 200 flows through the eighth switching element $Q_8$. Here, the current $i_{Lo}$ has a slope of $V_0/L_0$.

As discussed above, in this section, the freewheeling leg and the output leg in the output unit 200 are electrified, so a predetermined current $i_{Q8}$ may flow therein.

Here, the converter may operate in a freewheeling mode.

Meanwhile, Ts in FIG. 2 refers to one period of switching, and in a case in which a duty ratio of a switching element used for powering is 0.5 or less, a DC conversion ratio of the power supply apparatus according to an embodiment of the present invention may be represented by Equation 1 shown below.

$$\frac{V_O}{V_S} = 2D_1 \times \frac{N_S}{N_P} \qquad \text{[Equation 1]}$$

Here, $D_1$ ($D_1$<0.5) refers to an effective duty ratio of the converter. Also, Vs refers to an input voltage, and Vo refers to an output voltage.

Also, Np refers to a winding amount of primary side of the transformer, and Ns refers to a winding amount of the secondary side of the transformer. Also, $N_P=N_{P1}=N_{P2}$, and $N_S=N_{S1}=N_{S2}$.

Figure 4:
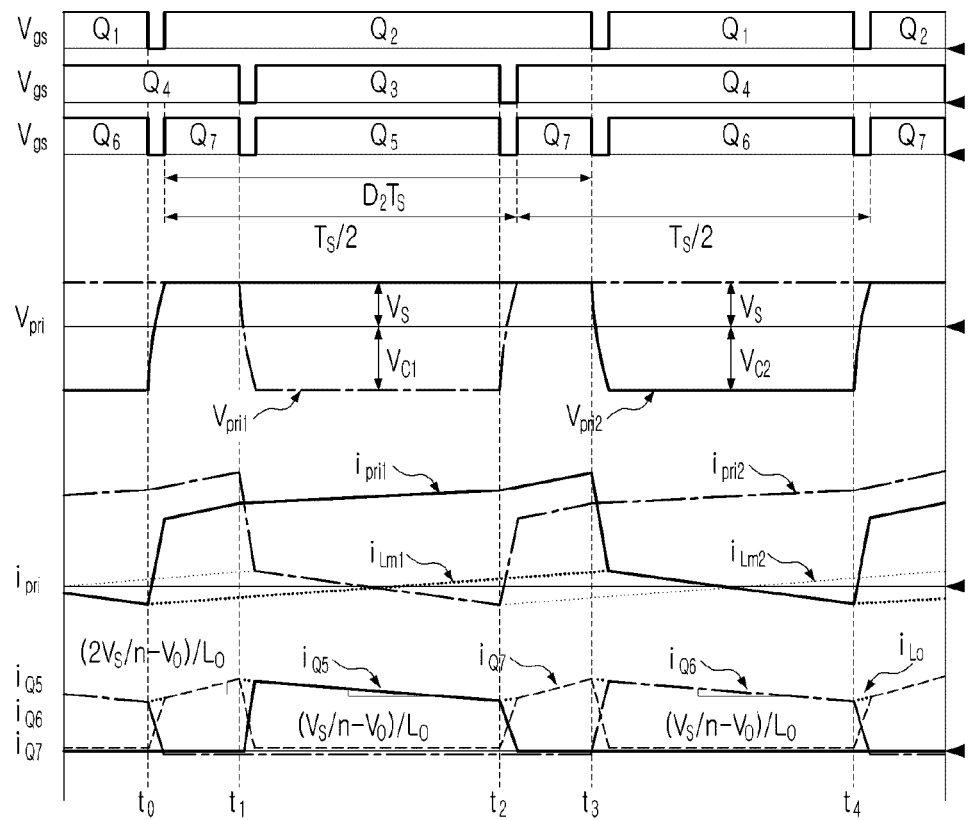
FIG. 4 is a view illustrating operational waveforms of major parts of the circuit in a case in which the duty ratio of the forward converter unit exceeds 0.5.

FIG. 4 is a view illustrating operational waveforms of major parts of the circuit in a case in which the duty ratio of the forward converter unit exceeds 0.5.

FIGS. 5A through 5D are views illustrating operational states of the circuit in the case in which the duty ratio of the forward converter unit exceeds 0.5.

Meanwhile, pale portions in FIGS. 5A through 5D refer to portions in which the circuit does not operate.

Referring to FIG. 4 and FIGS. 5A through 5D, in a case in which the duty ratio of the forward converter unit is set to exceed 0.5, a circuit operation may be divided into a first section t0~t1, a second section t1~t2, a third section t2~t3, and a fourth section t3~t4.

1. First Section (t0~t1)—$Q_4$:ON, $Q_3/Q_5/Q_8$:OFF, $Q_1/Q_6$: TURN OFF, $Q_2/Q_7$:TURN ON (Please See FIG. 5A)

Figure 5A:
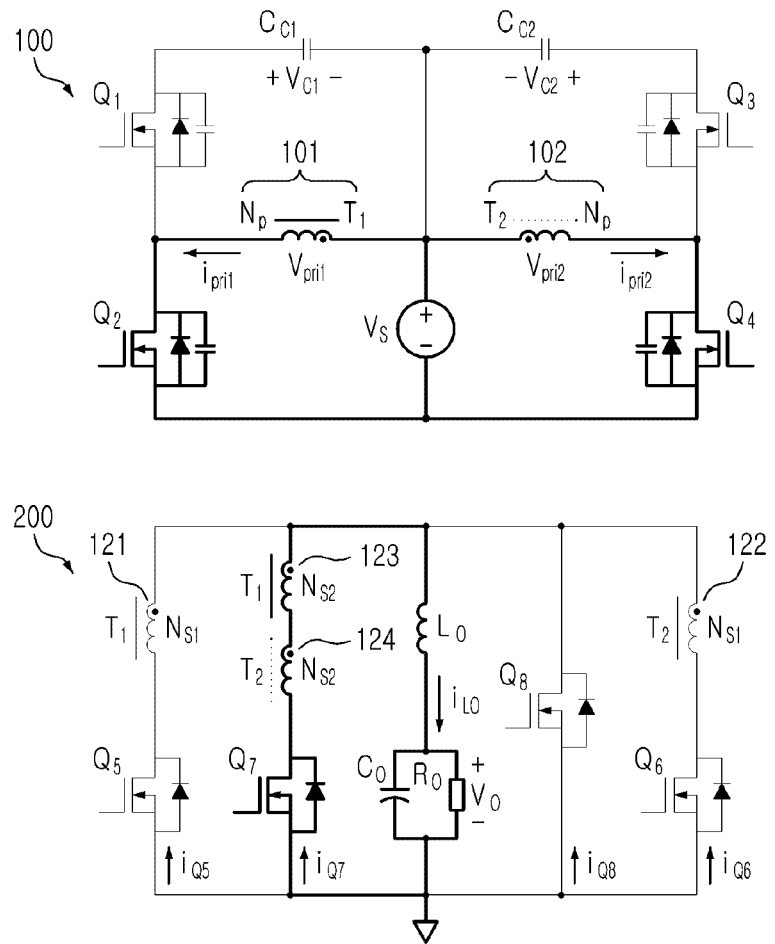
FIGS. 5A through 5D are views illustrating operational states of the circuit in the case in which the duty ratio of the forward converter unit exceeds 0.5.

FIG. 5A illustrates an operational circuit state in the first section.

In the first section, the first switching element $Q_1$ is turned off, and the second switching element $Q_2$ is turned.

Also, the fourth switching element $Q_4$ is in an ON state.

In this section, the first active clamp forward converter and the second active clamp forward converter may be powered.

At this time, in the output unit 200, the third powering leg in which the second secondary side winding 123 of the first transformer $T_1$ and the second secondary side winding 124 of the second transformer $T_2$ may be electrified. Also, the first powering leg and the second powering leg may not be electrified.

The voltage $V_{pri1}$ of the primary side winding 101 of the first transformer $T_1$ of the converter is 0V, and thus, the primary side current $T_{pri1}$ of the first transformer $T_1$ flows through a path for the primary side winding 101 of the transformer—the second switching element $Q_2$.

The voltage $V_{pri2}$ of the primary side winding 102 of the second transformer $T_2$ of the converter is 0V, and thus, the primary side current $T_{pri2}$ of the second transformer $T_2$ flows through a path for the primary side winding 102 of the transformer—the fourth switching element $Q_4$.

Meanwhile, since the seventh switching element $Q_7$ is turned on, the voltage of the secondary side winding 123 of the first transformer $T_1$ and the secondary side winding 124 of the second transformer $T_2$ is Vs/n, respectively, according to the winding ratio (n:1), and thus, the current $i_{L0}$ flowing to the inductor $L_0$ is increased with a slope of $(2V_s/n-V_0)/L_0$.

As discussed above, in this section, in the output unit 200, the third powering leg and the output leg are electrified, so a predetermined current $i_{Q7}$ may flow therein.

Here, the converter may operate in a powering mode.

2. Second Section (t1~t2)—$Q_2$:ON, $Q_1/Q_6/Q_8$:OFF, $Q_4/Q_7$:TURN OFF, $Q_3/Q_5$:TURN ON (Please See FIG. 5B)

Figure 5B:
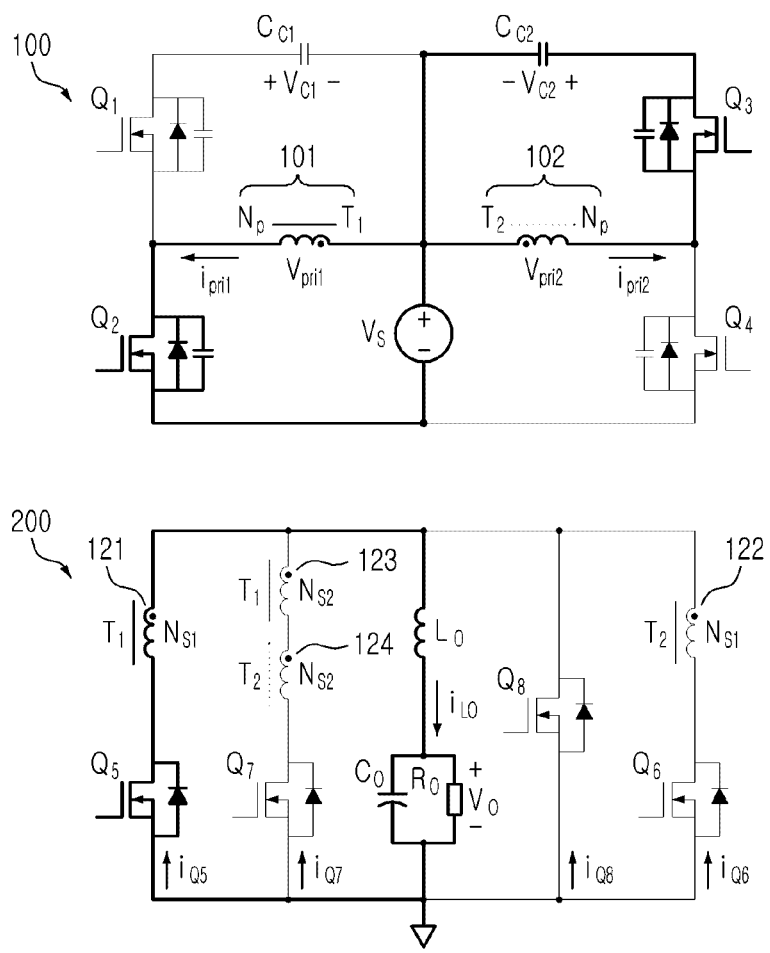

FIG. 5B illustrates an operational circuit state in the second section.

As the fourth switching element $Q_4$ is turned off and the third switching element $Q_3$ is turned on, the voltage $V_{pri1}$ of the primary side winding 101 of the first transformer $T_1$ of the converter is equal to the sum of the power source voltage Vs and the voltage $V_{C1}$ charged in the first clamping capacitor $C_{C1}$.

Thus, a primary side current $i_{pfi1}$ of the first transformer $T_1$ flowing through the primary side winding 101 of the first transformer $T_1$ and the second switching element $Q_2$ is increased with a predetermined slope.

Meanwhile, since the fifth switching element $Q_5$ is turned on, a voltage of the secondary side winding 121 of the first transformer $T_1$ is Vs/n according to the winding ratio (n:1), and thus, a current $i_{L0}$ flowing to the inductor $L_0$ is increased with a slope of $V_s/n-V_0)/L_0$.

Here, since the third switching element $Q_3$ is in an ON state, a predetermined voltage $V_{C2}$ may be charged in the second clamping capacitor $C_{C2}$.

As discussed above, in the output unit 200, the first powering leg and the output leg are electrified, so a predetermined current $i_{Q5}$ may flow therein.

As discussed above, in the second section, main power is powered from the primary side of the first transformer of the converter to the secondary side of the first transformer.

3. Third Section (t2~t3)—$Q_2$:ON, $Q_1/Q_6/Q_8$:OFF, $Q_3/Q_5$: TURN OFF, $Q_4/Q_7$:TURN ON (Please See FIG. 5C)

Figure 5C:
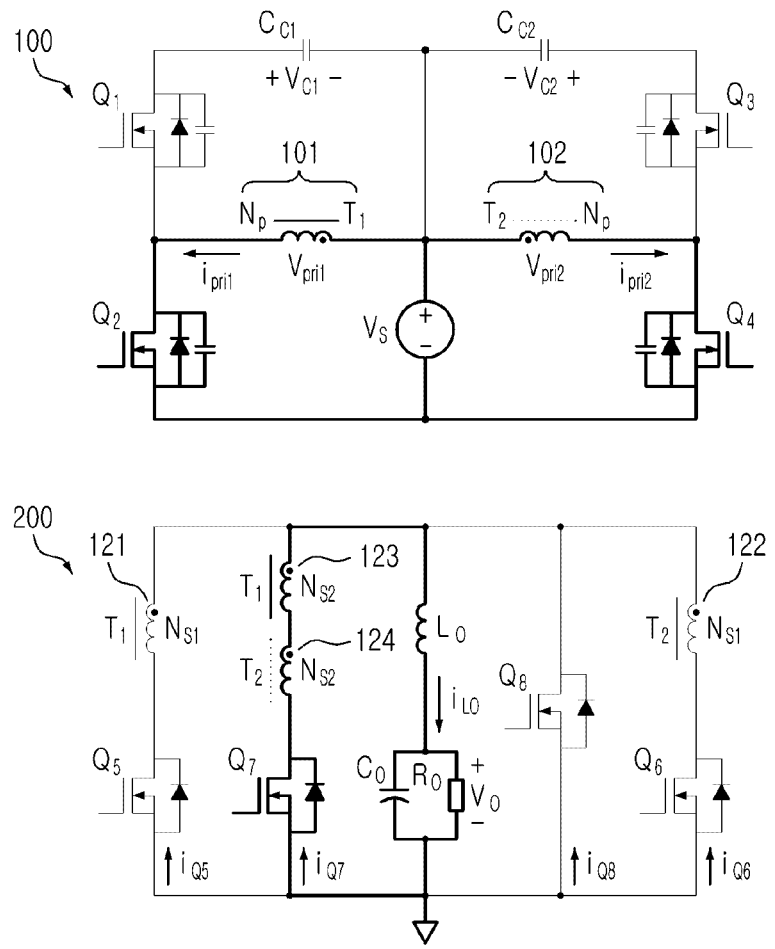

FIG. 5C illustrates an operational circuit state in the third section.

In this section, the third switching element $Q_3$ is turned off, and the fourth switching element $Q_4$ is turned on.

Also, the second switching element $Q_2$ is in an ON state.

In this section, the first active clamp forward converter and the second active clamp forward converter may be powered.

At this time, in the output unit 200, the third powering leg in which the second secondary side winding 123 of the first transformer $T_1$ and the second secondary side winding 124 of the second transformer $T_2$ may be electrified. Also, the first powering leg and the second powering leg may not be electrified.

The voltage $V_{pri1}$ of the primary side winding 101 of the first transformer $T_1$ of the converter is 0V, and thus, the primary side current $i_{pri1}$ of the first transformer $T_1$ flows through a path for the primary side winding 101 of the transformer—the second switching element $Q_2$.

The voltage $V_{pri2}$ of the primary side winding 102 of the second transformer $T_2$ of the converter is 0V, and thus, the primary side current $T_{pri2}$ of the second transformer $T_2$ flows through a path for the primary side winding 102 of the transformer—the fourth switching element $Q_4$.

Meanwhile, since the seventh switching element $Q_7$ is turned on, the voltage of the secondary side winding 123 of the first transformer $T_1$ and the secondary side winding 124 of the second transformer $T_2$ is Vs/n, respectively, according to the winding ratio (n:1), and thus, the current $i_{LO}$ flowing to the inductor $L_0$ is increased with a slope of $(2V_S/n-V_O)/L_0$.

As discussed above, in this section, in the output unit 200, the third powering leg and the output leg are electrified, so a predetermined current $i_{Q7}$ may flow therein.

Here, the converter may operate in a powering mode.

4. Fourth Section (t3~t4)—$Q_4$:ON, $Q_3/Q_5/Q_8$:OFF, $Q_2/Q_7$: TURN OFF, $Q_1/Q_6$:TURN ON (Please See FIG. 5D)

Figure 5D:
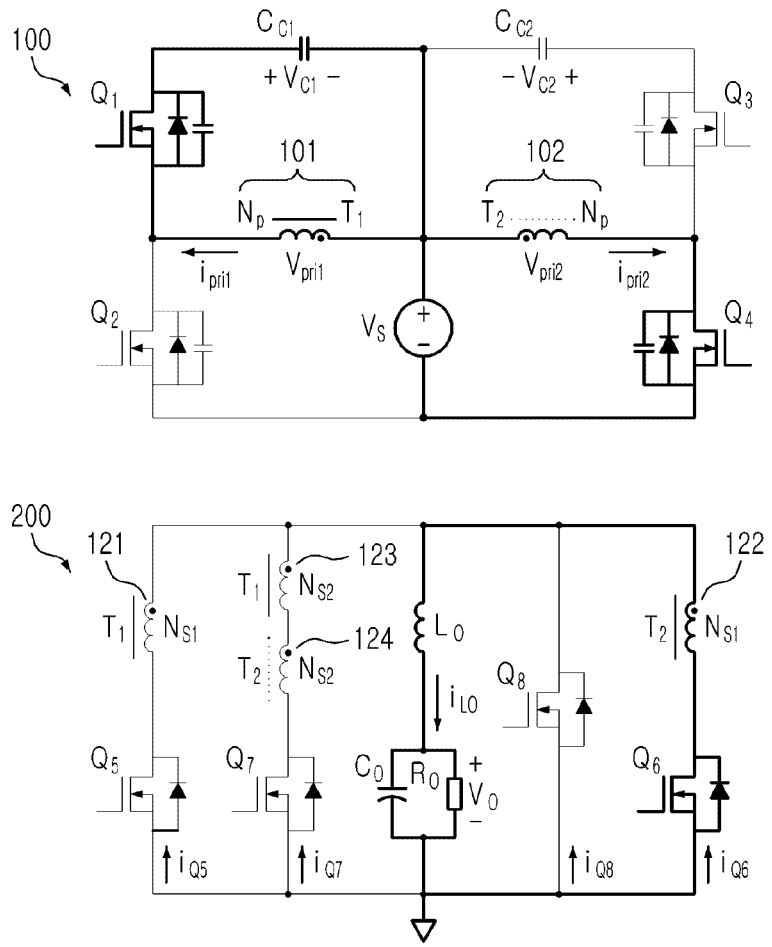

FIG. 5D illustrates an operational circuit state in the fourth section.

As the second switching element $Q_2$ is turned off and the firth switching element $Q_1$ is turned on, the voltage $V_{pri2}$ of the primary side winding 102 of the second transformer $T_2$ of the converter is equal to the sum of the power source voltage Vs and the voltage $V_{C2}$ charged in the second clamping capacitor $C_{C2}$.

Thus, a primary side current $i_{pri2}$ of the second transformer $T_2$ flowing along a path for the primary side winding 102 of the second transformer $T_2$—the fourth switching element $Q_4$ is increased with a predetermined slope.

Meanwhile, since the sixth switching element $Q_6$ is turned on, the secondary side winding 122 of the second transformer $T_2$ has a voltage Vs/n according to the winding ratio (n:1), and thus, the current $i_{LO}$ flowing to the inductor $L_0$ is increased with a slope of $(V_S/n-V_O)/L_0$.

In this case, since the first switching element $Q_1$ is in an ON state, a predetermined voltage $V_{C1}$ may be charged in the first clamping capacitor $C_{C1}$.

As discussed above, in this section, in the output unit 200, the second powering leg and the output leg are electrified, so a predetermined current $i_{Q6}$ may flow therein.

As described above, in the fourth section, main power is powered from the primary side of the second transformer of the converter to the secondary side of the second transformer.

Meanwhile, Ts in FIG. 2 refers to one period of switching, and in a case in which a duty ratio of a switching element used for powering exceeds 0.5, a DC conversion ratio of the power supply apparatus according to an embodiment of the present invention may be represented by Equation 2 shown below.

$$\frac{V_O}{V_S} = 2D_2 \times \frac{N_S}{N_P} \quad \text{[Equation 2]}$$

Here, $D_2$ ($D_2$>0.5) refers to an effective duty ratio of the converter. Also, Vs refers to an input voltage, and Vo refers to an output voltage.

Also, Np refers to a winding amount of primary side of the transformer, and Ns refers to a winding amount of the secondary side of the transformer. Also, $N_P=N_{P1}=N_{P2}$, and $N_S=N_{S1}=N_{S2}$.

According to the foregoing method, in the power supply apparatus according to an embodiment of the present invention, the duty ratio of the powering switching elements cannot exceed 0.5. Also, according to an embodiment of the present invention, the switching elements of the secondary side converter circuit can be driven without a floating gate driver.

As set forth above, according to embodiments of the present invention, the power supply apparatus in which a duty ratio of the powering switching elements is increased can be provided.

Also, the power supply apparatus in which the switching elements of the secondary side converter circuit are driven without a floating gate driver can be provided.

While the present invention has been shown and described in connection with the embodiments, it will be apparent to those skilled in the art that modifications and variations can be made without departing from the spirit and scope of the invention as defined by the appended claims.

What is claimed is:

1. A power supply apparatus comprising:
   an interleaved active clamp forward converter unit including a first active clamp forward converter and a second active clamp forward converter; and
   an output unit magnetically coupled to the forward converter unit and having an output path according to a duty ratio of the forward converter unit,
   wherein the output unit comprises:
   a third powering leg electrified when the first active clamp forward converter and the second active clamp forward converter are powered; and
   an output leg supplying power to a load,
   wherein the first active clamp forward converter comprises:
      a primary side winding of a first transformer connected to a positive (+) terminal of a power input unit;
      a second switching element connected between a negative (−) terminal of the power input unit and the primary side winding of the first transformer;
      a first clamping capacitor connected to a contact between the primary side winding of the first transformer and the positive (+) terminal of the power input unit; and
      a first switching element connected between a contact between the second switching element and the primary side winding of the first transformer and the first clamping capacitor.

2. A power supply apparatus comprising:
   an interleaved active clamp forward converter unit including a first active clamp forward converter and a second active clamp forward converter; and
   an output unit magnetically coupled to the forward converter unit and having an output path according to a duty ratio of the forward converter unit,
   wherein the output unit comprises:
   a third powering leg electrified when the first active clamp forward converter and the second active clamp forward converter are powered; and
   an output leg supplying power to a load,
   wherein the second active clamp forward converter comprises:
      a primary side winding of a second transformer connected to the positive (+) terminal of the power input unit;
      a fourth switching element connected between the negative (−) terminal of the power input unit and the primary side winding of the second transformer;
      a second clamping capacitor connected to a contact between the primary side winding of the second transformer and the positive (+) terminal of the power input unit; and a third switching element connected between a contact between the fourth switching element and the primary side winding of the second transformer and the second clamping capacitor.

3. The power supply apparatus of claim 1, wherein the output unit comprises a first powering leg electrified when the first active clamp forward converter is powered.

4. The power supply apparatus of claim 3, wherein the first powering leg comprises a first secondary side winding of a first transformer and a fifth switching diode connected in series.

5. The power supply apparatus of claim 1, wherein the output unit comprises a second powering leg electrified when the second active clamp forward converter is powered.

6. The power supply apparatus of claim 5, wherein the second powering leg comprises a first secondary side winding of a second transformer and a sixth switching diode connected in series.

7. The power supply apparatus of claim 1, wherein the third powering leg comprises a second secondary winding of the first transformer, a second secondary side winding of the second transformer, and a seventh switching diode connected in series.

8. The power supply apparatus of claim 1, wherein the output unit comprises a freewheeling leg providing a freewheeling path for the first active clamp forward converter and the second active clamp forward converter.

\* \* \* \* \*